(12) United States Patent
Jonas et al.

(10) Patent No.: US 7,885,777 B2
(45) Date of Patent: Feb. 8, 2011

(54) PROBE CALIBRATION

(75) Inventors: Kevyn Barry Jonas, Bristol (GB);
Jean-Louis Grzesiak, Bristol (GB);
Geoffrey McFarland,
Wotton-under-Edge (GB)

(73) Assignee: Renishaw PLC, Wotton-Under-Edge (GB)

( * ) Notice: Subject to any disclaimer, the term of this patent is extended or adjusted under 35 U.S.C. 154(b) by 519 days.

(21) Appl. No.: 11/918,492

(22) PCT Filed: Apr. 25, 2006

(86) PCT No.: PCT/GB2006/001502
§ 371 (c)(1),
(2), (4) Date: Oct. 15, 2007

(87) PCT Pub. No.: WO2006/114603
PCT Pub. Date: Nov. 2, 2006

(65) Prior Publication Data
US 2009/0248345 A1 Oct. 1, 2009

(30) Foreign Application Priority Data
Apr. 26, 2005 (GB) ................................. 0508390.2
Apr. 26, 2005 (GB) ................................. 0508402.5

(51) Int. Cl.
*G06F 19/00* (2006.01)
*G01B 5/004* (2006.01)

(52) U.S. Cl. ......................................... 702/95; 33/503
(58) Field of Classification Search .................. 702/95, 702/104; 33/503, 559
See application file for complete search history.

(56) References Cited

U.S. PATENT DOCUMENTS

| 4,333,238 | A | 6/1982 | McMurtry |
| 5,138,563 | A | 8/1992 | Debitsch et al. |
| 6,412,329 | B1 | 7/2002 | Nai |
| 6,909,983 | B2 * | 6/2005 | Sutherland .................. 702/104 |

FOREIGN PATENT DOCUMENTS

| EP | 0 759 534 B1 | 11/2002 |
| WO | WO 89/07745 | 8/1989 |
| WO | WO 00/25087 | 5/2000 |
| WO | WO 00/60310 | 10/2000 |
| WO | WO 02/073128 A1 | 9/2002 |

* cited by examiner

*Primary Examiner*—Bryan Bui
(74) *Attorney, Agent, or Firm*—Oliff & Berridge PLC

(57) ABSTRACT

A method of calibrating a probe is disclosed said probe being mounted on a machine and having a stylus with a workpiece contacting tip, comprising calculating calibration information for the probe for a first orientation of the probe, and rotating the calibration information by an angle to obtain a probe calibration information for when the probe is oriented by that angle with respect to the first orientation. Also disclosed is a method of calibrating a probe during a measurement process. The calibration information may include a vector which relates probe head axes to machine axes; a calibration matrix; datum data; an inertial matrix. The stylus tip may be datumed at the orientation of the probe or inferred from datum information obtained at different orientations. The rotation step may be carried out by a software/computer program which may be stored on a controller for the machine.

21 Claims, 6 Drawing Sheets

PROBE CALIBRATION

BACKGROUND OF THE INVENTION

1. Field of the Invention

This invention relates to a method of calibrating a probe for a coordinate positioning machine.

2. Description of Related Art

Coordinate positioning machines, such as coordinate measuring machines, machine tools and articulating measuring arms, comprise an arm and a table moveable relative to each other. Such a machine may be equipped with a probe to enable inspection of a workpiece. A probe may be typically classed as digital or analogue.

To enable use of the probe as an inspection device it must first be calibrated. A first aspect of probe calibration is the identification of the probe contacting tip in relation to the machine on which it is mounted. This may be called datuming or qualification. During the inspection process, the machine onto which the probe is mounted is driven towards the workpiece.

In the case of digital probes, contact with a surface causes a change in the state of the probe signal (from 0 to 1 or vice versa), a trigger signal is emitted and the machine outputs are latched. This latched position of the machine along with tip qualification information can be used to identify the position of a workpiece.

In analogue probing systems, a stylus is deflected when its tip contacts the workpiece and measurement transducers in the probe generate outputs representing the deflection of the stylus along three orthogonal axes which may be referred to as the a,b,c axes of the probe. These outputs, in addition to the tip qualification can be used to identify the position of a workpiece. When contact with a surface occurs, the probe signal changes, for example, gradually increasing in value. A contact is deemed to have occurred once the signal passes a threshold. A threshold is set to minimise the effect of false triggering due to machine vibrations. In order to establish where contact occurred, the change in signal strength must be related to movement of the machine axes. One way to do this is to calibrate the system by monitoring voltage output of the probe and relating the voltage output to movement along the three machine axes by use of a calibration matrix.

Thus, in the case of digital probes, all that is required is a tip qualification or datuming process. For analogue probes however, the output signal of the probe must be related to movement of the machine axes which requires a further calibration process. This calibration process involves both a datuming step and resolving the calibration matrix. This forms a second aspect of probe calibration.

One method of qualifying or datuming is to contact a sphere, which is mounted on the machine, with the stylus at least four different circumferential locations from which the stylus tip centre is established.

One method of performing an analogue probe calibration is described in International Patent Application No. WO00/25087 where a calibration artefact is mounted on the machine. The probe is driven towards the artefact, for example, along one of the machine axes, until an increase in the output of the measuring devices of the probe above a predetermined level (the threshold) indicates that contact with the artefact surface has occurred. After stylus contact has been confirmed, a set of machine x,y,z and probe a,b,c coordinate data are taken. Machine movement continues until the machine has moved a selected distance beyond the confirmed contact point, and a further set of x,y,z and a,b,c data are taken.

The changes in the a,b,c outputs of the probe's measurement transducers in the three axes are recorded and correlated with the changes in the machine's measurement devices along each of the machine axes. This is repeated for two other orthogonal directions, which may be the other two machine axes. From the sets of data, a probe transformation matrix can be established which relates the probe outputs in the a,b,c axes to the machine's x,y,z coordinate system for that particular probe orientation. The relevant machine axis components of the probe deflections can be obtained by multiplying the relevant probe output by the relevant matrix term.

An alternative method of performing an analogue probe calibration is described in International Patent Application No. WO02/073128.

It is often desirable to re-orientate the probe relative to the machine to enable inspection of differently oriented surfaces of the workpiece. The probe may be oriented on a probe head which may be an indexing type where it can be re-orientated into a number of discrete positions or, a continuous type where any angular orientation is possible.

There are a number of factors which affect the accuracy of a measurement made by a re-orientatable probe. These include machine errors such as squareness of axes, bending and linear errors; probe head errors including bending and positioning; and probe and stylus errors including bending. A bending error may be partially caused by gravity and partially caused by dynamic forces such as acceleration.

Traditionally, when indexing a measurement probe, it must be calibrated for each orientation of the probe relative to the machine axes to establish the true location of the stylus tip i.e. a re-datuming or re-qualification process is carried out. Furthermore, if the probe is an analogue transducer, the calibration process described above where a calibration matrix is established for a particular probe orientation along with a datuming step, must be carried out for each probe head position (or orientation). As it takes a few minutes to complete the process to obtain one such matrix, the entire calibration process can take hours to complete.

In European Patent No. 759534, the re-datuming step is simplified by inferring the current tip position using datum data from two positions between which the current position lies. Although the process is simplified, a plurality of datum readings must still be taken using this method.

Alternatively, for continuous probe heads, an encoder may be provided which provides the actual angular position of the probe. However, the relationship between the probe and the stylus must still be established. Thus, the probe is still datumed at each orientation or a plurality (if inferring is carried out) of orientations.

The datuming step described above applies to styli of the type where deflection is sensed at a location remote from the tip, for example by strain gauges or optical means. However, for contact probe systems where the tip position is transduced at the tip, it is only necessary to carry out tip qualification at one orientation as the tip location is constantly monitored. For this second type of stylus, used with an analogue probe, a calibration matrix must still be established for each orientation.

A third aspect of probe calibration is the detection and correction of inertial errors associated with the motion of a metrology system. It is known to compensate for such dynamic errors by providing an accelerometer in the probe from which can be determined dynamic deflection. Examples of such compensation methods are disclosed in U.S. Pat. Nos. 4,333,238 and 6,412,329.

BRIEF SUMMARY OF THE INVENTION

The invention comprises a method of calibrating a probe said probe being mounted on a machine and having a stylus with a workpiece measuring tip, comprising:
  calculating calibration information for the probe for a first orientation of the probe; and
  rotating the calibration information by an angle to obtain a probe calibration information for when the probe is oriented by that angle with respect to the first orientation.

A second aspect of the invention comprises a method of calibrating a probe, said probe being mounted on a machine and having a stylus with a workpiece measuring tip and, being relatively re-orientatable with respect to the machine, comprising
  calculating calibration information for the probe at an orientation of the probe with respect to the machine axes;
  during a measurement process, recording probe and machine axes outputs and the orientation of the probe with respect to the machine axes;
  rotating the calibration information based on the orientation of the probe with respect to the machine axes; and
  applying the rotated calibrated information to the probe outputs.

Calibration information preferably includes one or more of the following: a calibration matrix which relates the probe and machine axis systems; datum data which establishes the relationship between probe axis and machine axis systems and tip position; an inertial matrix; and a vector which relates probe head axes to machine axes.

Therefore, a novel aspect of the invention is as follows. The head/probe/stylus system need only be fully calibrated at one orientation, for example in a vertical orientation. This may involve measurements on an artefact such as a datum sphere. A calibration matrix which transforms the probe a,b,c axes into the machine x,y,z axes is derived at this orientation, thereby enabling the probe measurements and the machine's measurements to be combined additively to give the coordinates of the point being measured on the workpiece surface. This matrix may also correct for errors of the probe, such as non-linearities and squareness errors of its transducers. The stylus tip may also by qualified (datumed) in this orientation, as normal, if required.

Next, the head is re-orientated into a position desired for a measurement or scanning operation on a workpiece. Instead of re-calibrating at this new orientation, the calibration matrix just obtained as above is rotated for example, by a program which may be stored in the machine's controller, to match the new inferred tip position. It now transforms the new axes a,b,c of the probe at this orientation to the machine's x,y,z axes.

Optionally, the stylus tip may be re-qualified at the new orientation, e.g. against the datum sphere. It will be noted that this is a simpler, less time-consuming operation than a full re-determination of the calibration matrix at the new orientation. If, as is likely, the stylus tip is suffering a deflection at the new orientation, e.g. caused by gravitational droop, this re-qualification enables one to determine the precise orientation and/or tip position more accurately than merely using the transducers of the articulating head. The amount of rotation of the calibration matrix which is required may also be determined more accurately.

Instead of re-datuming at each orientation, the invention can be combined with the inferring aspect of European Patent No. 759534 to reduce the number of processes or steps involved in the calibration at different orientations.

In the same way, measurements can be taken at many other desired orientations of the probe, without a full re-calibration but merely by rotating the probe calibration matrix again to suit the new orientation.

For some probe systems, it is possible to just rotate the previously obtained calibration matrix by a computer program or software, for example, for the probes described in EP 360853, WO 00/60310 and WO 2006/114627 the actual position of the stylus tip is determined optically, relative to the probe or head.

In addition to relating probe and machine axis systems, it may also be necessary to relate probe head axes to machine axes as the probe head axes may not be aligned along the machine axes. Thus, in a preferred embodiment, the relationship between the probe head axes and the machine axes is established and the probe matrix is additionally rotated along the resultant vector.

BRIEF DESCRIPTION OF THE DRAWINGS

The invention will now be described by way of example, with reference to the drawings, of which.

DETAILED DESCRIPTION OF THE EXEMPLARY EMBODIMENTS

Figure 1:
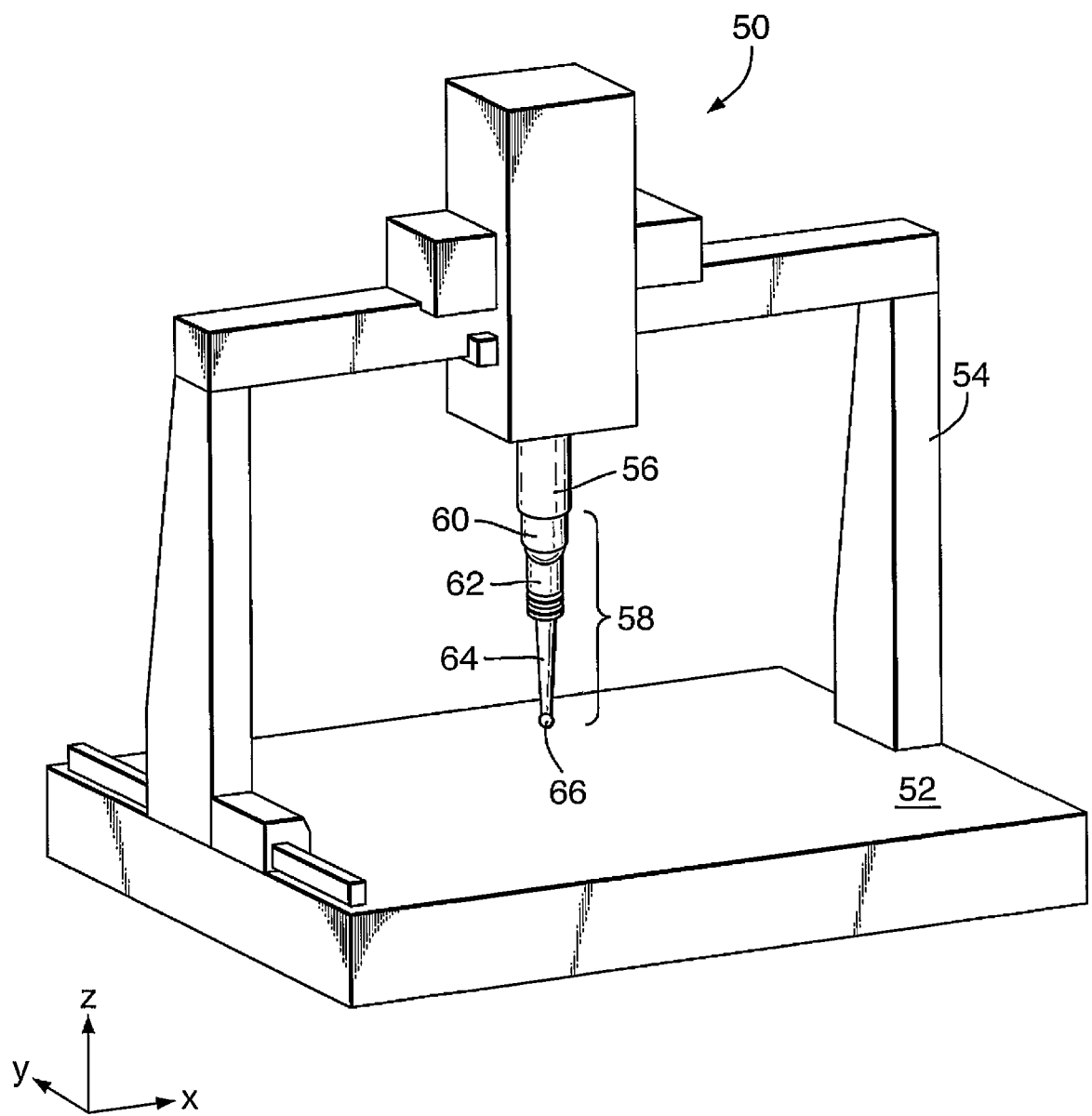
FIG. 1 shows schematically a measuring machine.

FIG. 1 shows a measuring machine, in this example a coordinate measuring machine or CMM 50. The CMM 50 has a base 52 and a gantry 54 which is moveable along x and y directions with respect to base 52. The gantry 54 includes a quill 56 which is moveable along a z direction with respect to the gantry 54 and has a measurement device 58 suspended therefrom. The measurement device 58 in this example includes a probe head 60 which is attached at one end to the quill 56 and at the distal end to a probe 62. The probe 62 has a stylus 64 with a workpiece contacting tip 66.

Figure 2A:
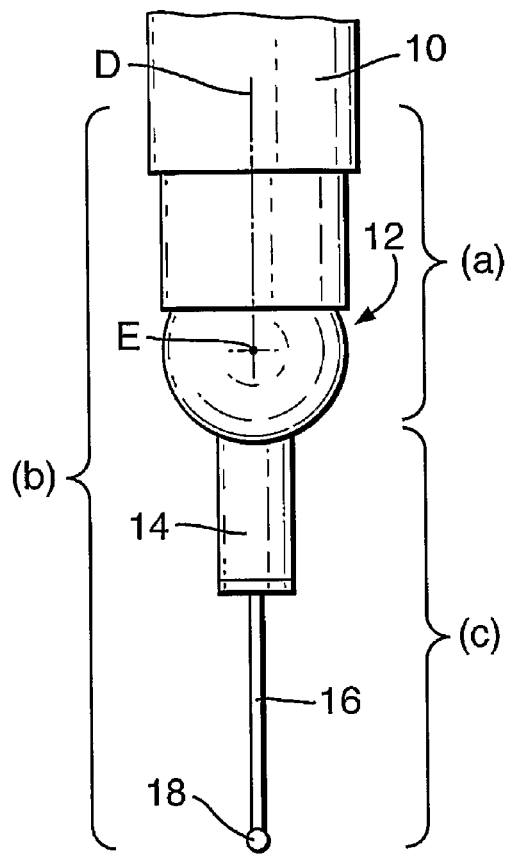
FIGS. 2a and b show side elevations of a probe head according to the invention.

FIGS. 2a and b show a quill 10 which is attached at one end to a coordinate positioning machine (not shown) and, at its distal end to a probe head 12. The probe head 12 rotates about axes D and E. The probe head 12 is further connected to a probe 14 having a stylus 16 having a tip 18. The stylus 16 deflects on contact with a workpiece and this deflection is sensed by the probe. The probe output a,b,c which results from this deflection is combined with a machine output x,y,z to produce a measured reading. Measuring systems include electrical, inductive, magnetic, optical and capacitive measurement of the stylus deflection. An example of this kind of system is given in EP360853.

Figure 3A:
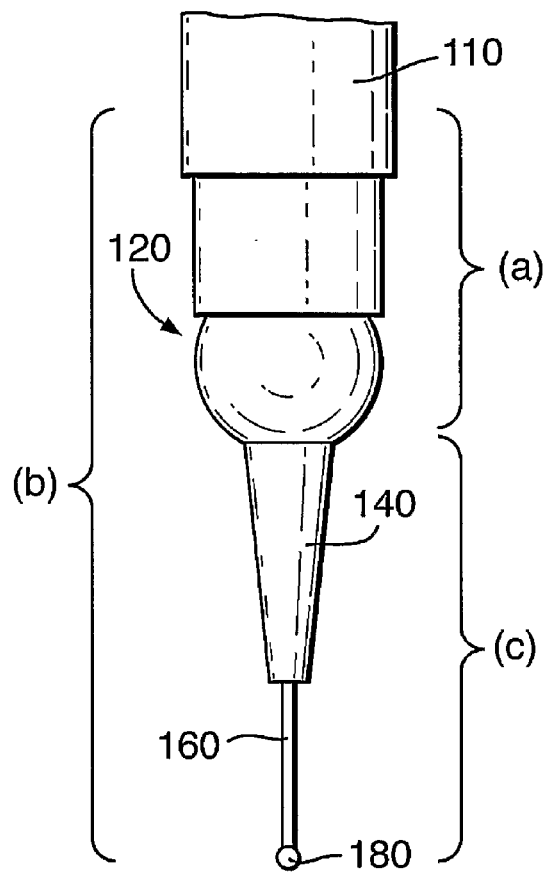
FIGS. 3a and b show side elevations of an alternative probe head according to the invention.

FIGS. 3a and b show a quill 110 which is attached at one end to a coordinate positioning machine (not shown) and, at its distal end to a probe head 120. The probe head 120 rotates about axes D and E. The probe head 120 is further connected to a probe 140 having a stylus 160 having a tip 180. In this example, deflection of the stylus is sensed at the stylus tip. The stylus tip position is measured optically and contact with a workpiece bends the stylus resulting in a change in the light received from the stylus tip. When the reading from the stylus tip 180 meets a predetermined level, the probe output a,b,c which results at this location is combined with a machine output x,y,z to produce a measured reading. Such a probing system is described in International Publication Number WO00/60310.

In order that any measurements that are taken are accurate, the probe needs to be calibrated. In the present invention this involves a number of steps which enables a current stylus position to be inferred from a known orientation.

There are a number of embodiments which fall within the scope of the present invention. These are summarised below and are then discussed more fully in turn.

Figure 3B:
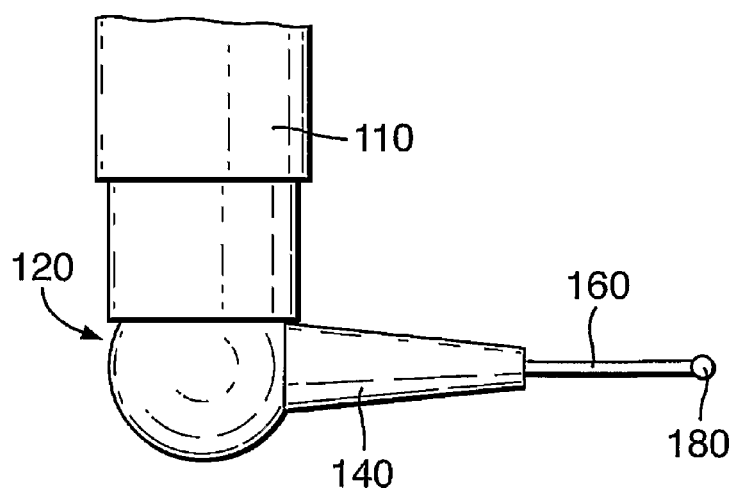

For probe systems whereby the stylus tip position is measured directly for example, in contacting optical systems such as is described with respect to FIG. 3, a calibration matrix needs to be established for a probe orientation which is then rotated by an angle to determine the calibration matrix for the probe when oriented at that angle.

In a preferred embodiment, the re-orientation process can be done on the fly i.e. during a measurement process. This is particularly useful for situations where the probe head is used as a pivot thus, the two probe head axes provide scanning movement of the stylus tip rather than situations where the probe head orientation is fixed with respect to the machine axes. In this embodiment, the calibration matrix is established and stored, for example in the machine controller. The measuring process begins and, after a predetermined clock count the controller interrogates the probe and machine for output readings and angular position in the case of the probe head. The angular reading enables the controller to rotate the matrix to the given angular position, apply the rotated matrix to the probe outputs and, then add the resultant figures to the machine outputs to give an accurate location for the stylus tip and thus the workpiece surface.

Figure 2B:
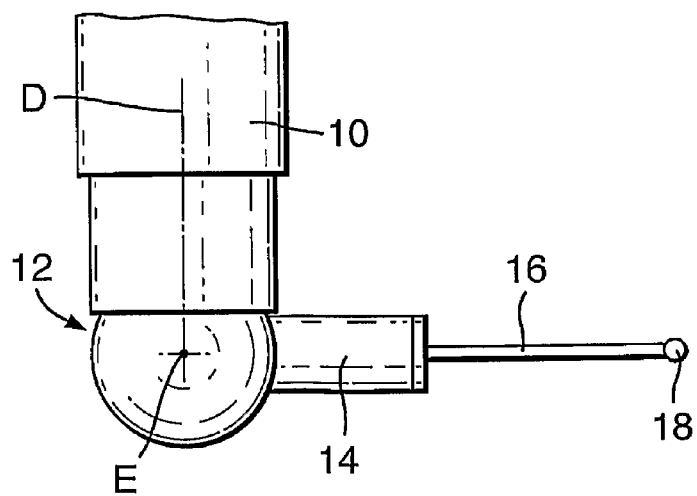

For probe systems whereby the stylus tip position is indicated by the sensing of a deflection remote from the stylus tip such as is described with respect to FIG. 2, in addition to establishing a calibration matrix and rotating it by an angle to determine the calibration matrix for the probe when oriented at that angle, the actual position of the stylus tip needs to be established i.e. the probe must be datumed or re-qualified at the new position. This is because the effect of bending of the stylus due to gravity and/or other dynamic effects are not known.

The re-datuming process can be achieved in a number of ways, including carrying out a datuming step each time the probe head is re-orientated; carrying out a datuming step for each new orientation visited and recording this information in a look-up table so each orientation is only datumed once for a given probing system; and datuming at a few chosen orientations, recording the results and inferring between the measured data. For the later method, the datum data may be recorded in a look-up table, the interpolation carried out and this figure applied to the calibration matrix or, the look-up table could store resolved data i.e. the datum data applied to the rotated calibration matrix and then it is this resolved data which is used in the interpolation step.

Referring now to FIGS. 2 and 3, in step (a), the position of the probe head is related to the machine coordinate system. To achieve this, the relative positions of the head axes D and E are established and the position and alignment of the probe head is calibrated to the quill. In step (b), the position of the stylus is related to the machine coordinate system. The probe is calibrated in one position, usually with the stylus tip pointing vertically downwards at $D_0E_0$. In a step (c), the calibration matrix of the probe is inferred from (b) and (a). In step (d), the inferred position is rotated with respect to the probe head axes D,E to give current stylus position.

The step of establishing the relative positions of the head axes D and E and calibrating the position and alignment of the probe head to the quill produces a vector along which the calibration matrix is rotated along with the rotation due to the change in orientation of the stylus due to rotation.

Thus, the invention additionally provides a method of calibrating a probe on a coordinate positioning machine comprising the steps of:
 (a) establishing the position of the probe head with respect to the machine;
 (b) establishing the position of the stylus tip with respect to the machine at an orientation;
 (c) producing a calibration matrix by inferring the relationship between the stylus tip and the probe from (a) and (b); and
 (d) using the calibration matrix to establish the position of the stylus tip with respect to the machine at a current orientation.

Equation 1 shows this mathematically $$\frac{\text{End of Quill, Tip}}{[\text{Head alignment}] \times [Rot_D] * \left[ \frac{\overrightarrow{dDE} + [Rot_E] \times \overrightarrow{\text{Probe Vector}}}{\overrightarrow{HTip_{D_0E}}} \right]}{\overrightarrow{HTip_{DE}}}$$

Figure 4:
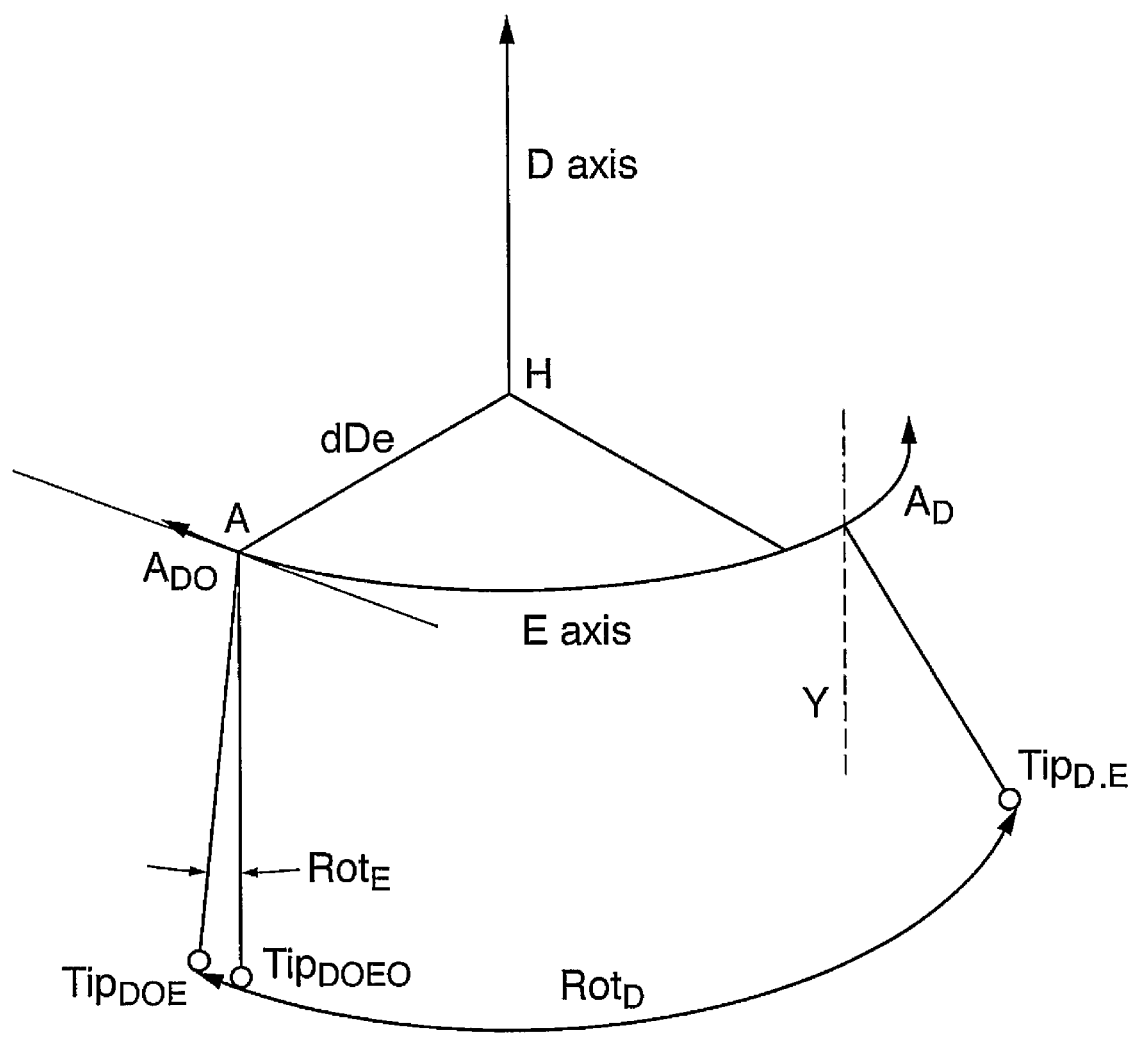
FIG. 4 shows diagrammatically rotation of the inferred position.

Referring to equation 1 and FIG. 4:

H denotes the centre of the probe head and $\text{Tip}_{D0E0}$ is the calibrated position of the stylus tip in relation to the machine coordinate system.

The probe vector is established from the distance between $A_{D0}$ and the stylus tip plus in the case of scanning probes a deflection vector.

To establish the relationship between the probe head and stylus tip with respect to axis E, $A_{D0}\text{Tip}_{D0E}$ the probe vector is multiplied by $Rot_E$, the rotation angle of the probe in axis E, and added to the distance between the centres of rotation for axes D and E. The centre of axis D is H and for axis E the centre is $A_{D0}$ and their difference is denoted dDE.

To establish the relationship between the probe head and stylus tip at the current probe orientation $HTip_{DE}$, $HTipD_{0E}$ is multiplied by $Rot_D$, the rotation angle of the probe in axis D.

To establish the relationship between the end of quill and the stylus tip, $HTip_{DE}$ is multiplied by the head alignment matrix.

One way to establish the centre of the probe head H is by taking four measurement points which establish the plane of orientation of the head. A fifth measurement point defines the sphere of which H is the origin.

Figure 5A:
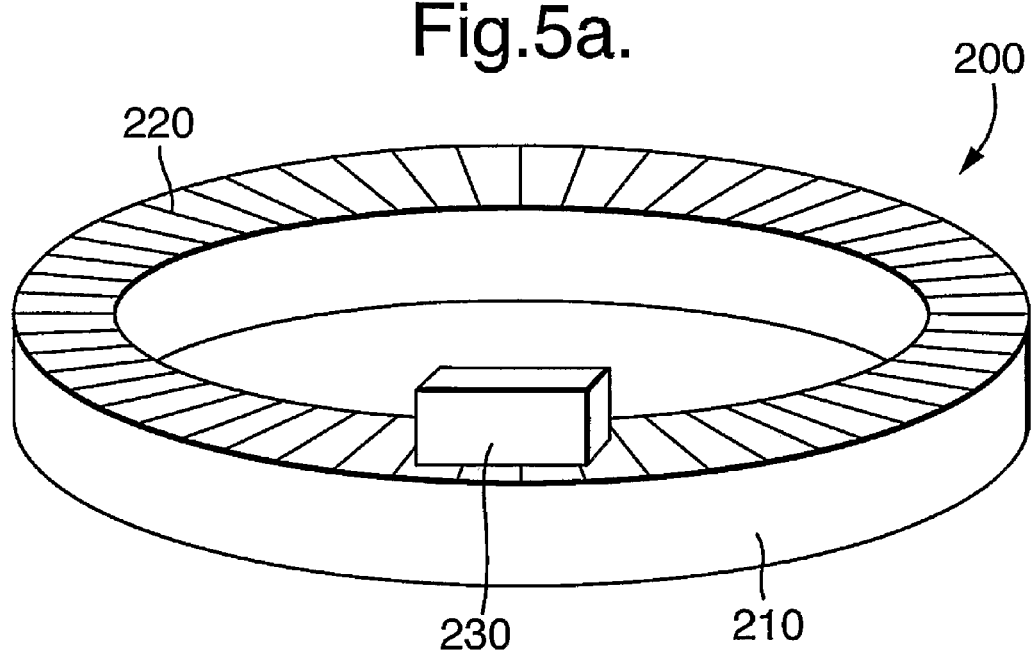
FIGS. 5a and b show an angular encoder.
Figure 5B:
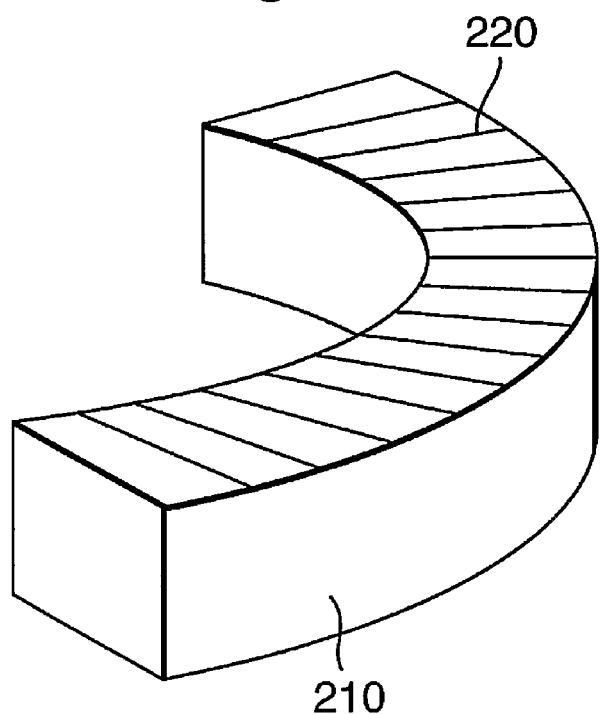

Referring now to FIGS. 5a and b, which show perspective views of an encoder 200 which comprises a ring 210 having a plurality of index marks 220 and a readhead 230. The ring 210 is provided on one part of the probe head and the readhead 230 on a relatively movable part. The readhead 230 counts the index marks as the probe head rotates. As the encoder is pre-calibrated, for this example $Rot_D$ and $Rot_E$ are known.

Figure 6A:
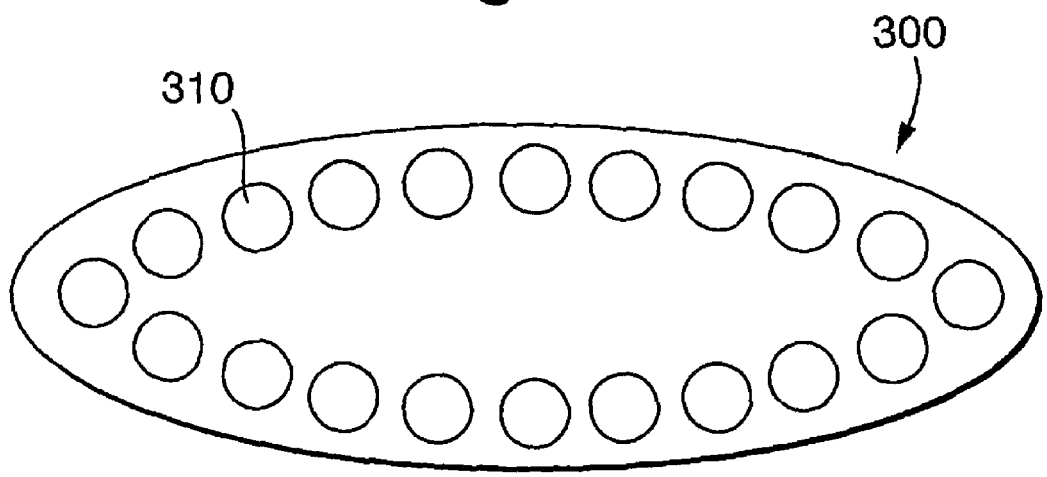
FIGS. 6a and b show part of an indexing probe.
Figure 6B:
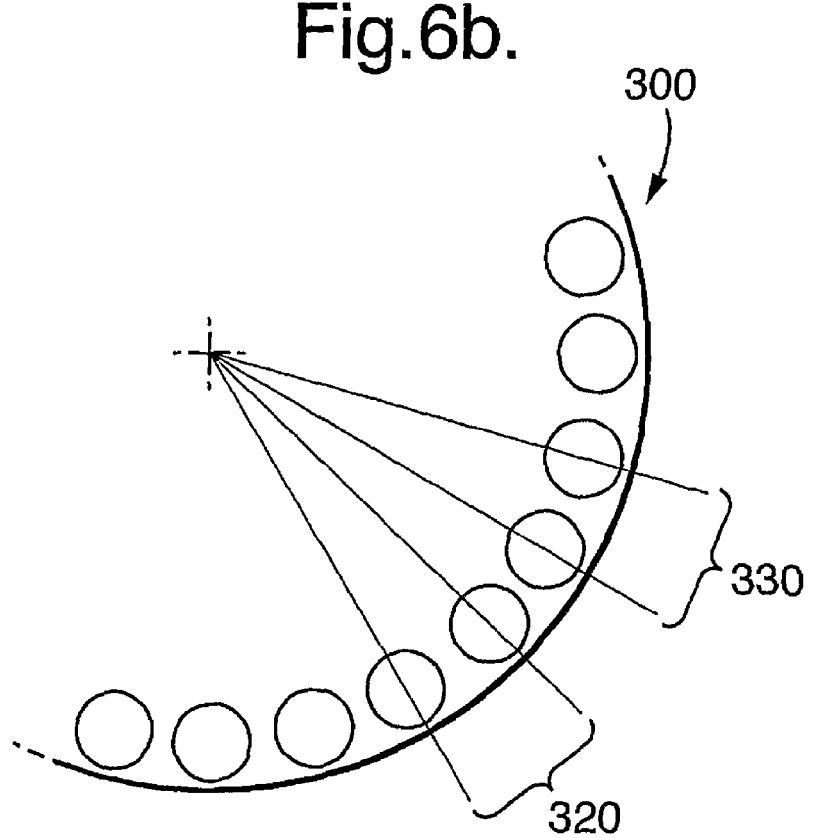

FIGS. 6a and b show one part of an indexing head mechanism 300. A plurality of balls 310 are embedded in the mechanism 300 nominally spaced apart. However, the distance between the centres of different balls 320,330 varies so, each index position must be calibrated in order to establish the true angular distance between index locations and thus $Rot_D$ and Rot$_E$. The co-operating part of the indexing head is provided with three balls or rollers radially spaced apart which locate between different pairs of balls 310.

The deflection of a contacting stylus may be sensed at the tip of the stylus or within the probe. Capacitive and inductive systems may use either method, magnetic and electric sense the deflection within the probe and optical, such as is described in WO 2006/114627, sense at the tip of the stylus.

When the deflection is sensed remote from the tip, sag or droop of the stylus due to gravity and/or other dynamic forces must be taken account of as this affects the location of the stylus tip. To do this, at the relevant orientation of the probe head, the stylus is qualified by taking at least four measurement points around a datum sphere.

By way of example, calibration may be performed on an articulating probe head and stylus as shown in EP 360853. In that specification, strain gauges on the stylus detect the deflection of the stylus tip relative to the probe due to bending of the stylus. Or calibration may be performed on an articulating head, probe and stylus as described in either WO 00/60310 or the above-mentioned WO 2006/114627. In those, an optical sensor passes a light beam along the stylus in order to determine the deflection of the workpiece-contacting (or workpiece-sensing or measuring) stylus tip relative to the probe due to bending of the stylus. In each case, the stylus bending may be caused by various forces, such as the contact force with the workpiece surface, inertial forces due to acceleration during a workpiece scanning operation, and/or gravitational droop.

In the prior art, with articulating heads and styli such as just mentioned in the previous paragraph, the practice has been to make a full calibration at each orientation of the head which is to be used. That is time consuming, and we have now realised that it is unnecessary.

Dynamic errors associated with motion of a machine that the probe head is attached to that are not affected by the rotational positioning of the head can be removed as described above using accelerometers. However, for those dynamic errors which are associated with the probe and caused by motion of the machine and which are related to the machine through the probe head orientation can be determined for a particular orientation and then rotated and applied to a new orientation. Thus, an inertial matrix for the measuring system can be established which relates the probe to the machine on which it is mounted and rotated in the same manner as the calibration matrix.

Thus, the calibration information may include an inertial matrix which is rotated in the same manner as described with respect to the calibration matrix.

The calibration method described is suitable for use with a wide variety of probe systems including scanning and tough trigger systems where contact between the probe and an object is sensed either at or remote from the point of contact. Such probe systems may be used on many measuring machines including, but not limited to coordinate positioning machines, machine tools, articulating measuring arms, non-Cartesian measuring machines, and robots.

The invention claimed is:

1. A method of calibrating a scanning or analogue probe said probe being mounted on a machine including a controller, the scanning or analogue probe being relatively re-orientatable between a plurality of orientations with respect to the machine, the probe including a deflectable stylus with a workpiece measuring tip and having an output which measures an amount of deflection of the stylus with respect to the probe, the method comprising:

calculating a probe calibration matrix which calibrates the output of the probe for a first orientation of the probe; and rotating said probe calibration matrix by an angle to obtain a further probe calibration matrix which calibrates the output of the probe at a second orientation of the probe where the probe is oriented by that angle with respect to the first orientation, the controller or the machine controlling the rotation of the probe calibration matrix.

2. A method according to claim 1, wherein in addition to the calibration matrix, a vector which relates probe head axes to machine axes is calculated and the matrix is additionally rotated along the resultant vector.

3. A method according to claim 1, wherein in addition to the calibration matrix, an inertial matrix which relates dynamic errors of the machine to the probe head is calculated for the first orientation of the probe and is rotated by an angle to obtain an inertial calibration for when the probe is oriented by that angle with respect to the first orientation.

4. A method according to claim 1, wherein the stylus tip is datumed at the orientation of the probe.

5. A method according to claim 1, wherein a deflection of the stylus is transduced at the stylus tip.

6. A method according to claim 4, wherein stylus tip datum information is stored in a look-up table.

7. A method according to claim 4, wherein location of the stylus tip at the orientation is inferred from datum information obtained at different orientations.

8. A method according to claim 4, wherein the datum information for an orientation is applied to the rotated calibration matrix to produce resolved data and the resolved data is stored in a look-up table.

9. A method according to claim 1, wherein the rotation step is carried out by a software/computer program that is stored on the controller for the machine.

10. A method of calibrating a scanning probe, said scanning probe being mounted on a machine including a controller, the scanning probe being relatively re-orientatable between a plurality of orientations with respect to axes of the machine, the probe including a deflectable stylus with a workpiece measuring tip and having an output which measures an amount of deflection of the stylus with respect to the probe, the method comprising:

calculating a probe calibration matrix which calibrates the output of the probe at a first orientation of the probe with respect to the machine axes;

during a measurement process, re-orienting the probe to a further orientation with respect to the machine axes, and recording probe and machine axes outputs and said further orientation of the probe;

rotating said probe calibration matrix based on the further orientation of the probe with respect to the machine axes, the controller or the machine controlling the rotation of the probe calibration matrix; and applying the rotated probe calibration matrix to the probe outputs.

11. A method according to claim 10, wherein in addition to the calibration matrix, a vector which relates probe head axes to machine axes is calculated and the matrix is additionally rotated along the resultant vector.

12. A method according to claim 10, wherein in addition to the calibration matrix, an inertial matrix which relates dynamic errors of the machine to the probe head is calculated for the first orientation of the probe and is rotated by an angle to obtain an inertial calibration for when the probe is oriented by that angle with respect to the first orientation.

13. A method according to claim 10, wherein a deflection of the stylus is transduced at the stylus tip.

14. A method according to claim 10, wherein the stylus tip is datumed at the orientation of the probe.

15. A method according to claim 14, wherein stylus tip datum information is stored in a look-up table.

16. A method according to claim 14, wherein location of the stylus tip at the orientation is inferred from datum information obtained at different orientations.

17. A method according to claim 14, wherein the datum information for an orientation is applied to the rotated calibration matrix to produce resolved data and the resolved data is stored in a look-up table.

18. A method according to claim 10, wherein the rotation step is carried out by a software/computer program that is stored on the controller for the machine.

19. A method of calibrating a scanning or analogue probe said probe being mounted on a machine including a controller, the probe being relatively re-orientatable between a plurality of orientations with respect to the machine, the probe having a measurement transducer generating an output which measures a workpiece with respect to the probe, the method comprising:

calculating a probe calibration matrix which calibrates the output of the probe for a first orientation of the probe; and rotating said probe calibration matrix by an angle to obtain a further probe calibration matrix which calibrates the output of the probe at a second orientation of the probe where the probe is oriented by that angle with respect to the first orientation, the controller or the machine controlling the rotation of the probe calibration matrix.

20. A method according to claim 19, wherein in addition to the calibration matrix, a vector which relates probe head axes to machine axes is calculated and the matrix is additionally rotated along the resultant vector.

21. A method according to claim 19, wherein in addition to the calibration matrix, an inertial matrix which relates dynamic errors of the machine to the probe head is calculated for a first orientation of the probe and is rotated by an angle to obtain an inertial calibration for when the probe is oriented by that angle with respect to the first orientation.

* * * * *